(12) United States Patent
Ahmed et al.

US011431609B2

(10) Patent No.: US 11,431,609 B2
(45) Date of Patent: Aug. 30, 2022

(54) DYNAMIC NETWORK SERVICE DATA ROUTING BASED ON MEASURED NETWORK PERFORMANCE DATA

(71) Applicant: Hewlett Packard Enterprise Development LP, Houston, TX (US)

(72) Inventors: Faraz Ahmed, Palo Alto, CA (US); Puneet Sharma, Palo Alto, CA (US); Diman Zad Tootaghaj, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 194 days.

(21) Appl. No.: 16/862,629

(22) Filed: Apr. 30, 2020

(65) Prior Publication Data

US 2021/0344587 A1    Nov. 4, 2021

(51) Int. Cl.
*H04L 43/10* (2022.01)
*H04L 45/02* (2022.01)
*G06N 20/00* (2019.01)
*G06N 7/00* (2006.01)
*H04L 45/00* (2022.01)
*H04L 67/01* (2022.01)

(52) U.S. Cl.
CPC ............ *H04L 45/08* (2013.01); *G06N 7/005* (2013.01); *G06N 20/00* (2019.01); *H04L 43/10* (2013.01); *H04L 45/22* (2013.01); *H04L 45/70* (2013.01); *H04L 67/01* (2022.05)

(58) Field of Classification Search
CPC ......... H04L 45/08; H04L 43/10; H04L 45/22; H04L 45/70; H04L 67/42; G06N 20/22; G06N 7/005
See application file for complete search history.

(56) References Cited

U.S. PATENT DOCUMENTS

| 10,045,276 | B2 | 8/2018 | Chou et al. |
| 11,216,496 | B2* | 1/2022 | Duffy .................... G06F 16/904 |
| 2006/0268718 | A1* | 11/2006 | Jones ...................... H04L 43/12 |
| | | | 370/235 |
| 2015/0078163 | A1* | 3/2015 | Bryskin ............. H04Q 11/0001 |
| | | | 370/235 |

(Continued)

OTHER PUBLICATIONS

Appavoo et al., "Shrewd Selection Speeds Surfing: Use Smart EXP3!", In Proceedings of the IEEE 38th International Conference on Distributed Computing Systems (ICDCS), 17 pages.

(Continued)

*Primary Examiner* — Viet D Vu
(74) *Attorney, Agent, or Firm* — Hewlett Packard Enterprise Patent Department

(57) ABSTRACT

An example client device includes processing circuitry and a memory including instructions that, when executed by the processing circuitry, cause the client device to undertake certain actions. Certain instructions cause the device to periodically measure active network performance data for a network, calculate expected rewards for the plurality of entry points, select an expected best entry point based on the expected rewards, route data to the selected entry point, measure passive network performance data for the selected entry point, and update a reinforcement learning algorithm, based in part on the measured passive network performance data.

20 Claims, 5 Drawing Sheets

(56) References Cited

U.S. PATENT DOCUMENTS

| | | | |
|---|---|---|---|
| 2017/0347308 A1* | 11/2017 | Chou | H04L 45/70 |
| 2018/0270126 A1* | 9/2018 | Tapia | H04L 41/5009 |
| 2018/0349943 A1 | 12/2018 | Ghavamzadeh | |
| 2020/0019983 A1* | 1/2020 | Johnston, Jr. | G06Q 30/0244 |

OTHER PUBLICATIONS

Auer et al., "The Nonstochastic Multiarmed Bandit Problem", Society for Industrial and Applied Mathematics, vol. 32, No. 01, 2002, pp. 48-77.

Azari et al, "Self-organized Low-power IoT Networks: A Distributed Learning Approach", Research Gate, Jul. 15, 2018, 8 pages.

Bonnefoi et al., "Multi-Armed Bandit Learning in IoT Networks: Learning helps even in non-stationary settings", 12th EAI International Conference on Cognitive Radio Oriented Wireless Networks, Sep. 2017, 14 pages.

Box et al., "Time Series Analysis: Forecasting and Control", Journal of Time Series Analysis, 5th Edition, Mar. 2016, 4 pages.

Brendan et al., "Tighter Bounds for Multi-Armed Bandits with Expert Advice", Google, Inc., 2009, 10 pages.

Bubeck et al., "Regret Analysis of Stochastic and Nonstochastic Multi-armed Bandit Problems", Foundations and TrendsR in Machine Learning, vol. 5, No. 1, 2012, 124 pages.

Calder et al., "Analyzing the Performance of an Anycast CDN", In Proceedings of the 2015 Internet Measurement Conference, 2015, Oct. 28-30, 2015, pp. 531-537.

Chambers et al., "Measurement-based Characterization of a Collection of On-line Games", USENIX Association, Internet Measurement Conference, 2005, 14 pages.

Chen et al., "End-User Mapping: Next Generation Request Routing for Content Delivery", ACM, 2015, pp. 167-181.

Chu et al., "Contextual Bandits with Linear Payoff Functions", Proceedings of the 14th International Conference on Artificial Intelligence and Statistics, vol. 15, 2011, pp. 208-214.

Collier et al., "Deep Contextual Multi-armed Bandits", Jul. 25, 2018, 6 pages.

Daher et al., "Cognitive Management of Self-Organized Radio Networks Based on Multi Armed Bandit", IEEE International Symposium on Personal, Indoor and Mobile Radio Communications, Oct. 2017, 6 pages.

Frank et al., "Pushing CDN-ISP Collaboration to the Limit", ACM SIGCOMM Computer Communication Review, vol. 43, No. 3, Jul. 2013, pp. 35-44.

Freedman et al., "OASIS: Anycast for Any Service", NSDI 3rd Symposium on Networked Systems Design & Implementation, USENIX Association, 2006, pp. 129-142.

Ghoorchian et al., "Multi-Armed Bandit for Energy-Efficient and Delay-Sensitive Edge Computing in Dynamic Networks with Uncertainty", Apr. 12, 2019, 30 pages.

Goel et al., "Faster Web through Client-assisted CDN Server Selection", IEEE, 2015, 10 pages.

Google Cloud, "Core VPN Concepts", available online at <https://cloud.google.com/vpn/docs/concepts/>, retrieved on May 1, 2020, 2 pages.

Gopalan et al., "Thompson Sampling for Complex Online Problems", Proceedings of the 31st International Conference an Machine Learning, vol. 32, 2014, 9 pages.

He et al., "Endhost-Based Shortest Path Routing in Dynamic Networks: Supporting Materials", Semantic Scholar, 2012, pp. 1-8.

Jiang et al., "CFA: A Practical Prediction System for Video QoE Optimization", 13th USENIX Symposium on Networked Systems Design and Implementation (NSDI '16) is sponsored by USENIX, Mar. 16-18, 2016, pp. 137-150.

Jiang et al., "Pytheas: Enabling Data-Driven Quality of Experience Optimization Using Group-Based Exploration-Exploitation", In Proceedings of the 14th USENIX Conference on Networked Systems Design and Implementation (NSDI'17), 2017, 14 pages.

Jiang et al., "VIA: Improving Internet Telephony Call Quality Using Predictive Relay Selection", In Proceedings of the 2016 ACM SIGCOMM Conference(SIGCOMM '16), 2016, 14 pages.

Kotronis et al., "Shortcuts through Colocation Facilities", IMC, 2017, pp. 470-476.

Li et al., "Provably Optimal Algorithms for Generalized Linear Contextual Bandits", In Proceedings of the 34th International Conference on Machine Learning, 2017, 17 pages.

Liu et al., "Adaptive Shortest-Path Routing under Unknown and Stochastically Varying Link States", In Modeling and Optimization in Mobile, Ad Hoc and Wireless Networks (WiOpt), Jan. 24, 2012, pp. 1-10.

Microsoft Azure, "What is Azure Relay?", Jul. 23, 2019, 143 pages.

Miller et al., "QoE-Based Low-Delay Live Streaming Using Throughput Predictions", ACM Trans. Multimedia Comput. Commun. Appl, vol. 13, No. 01, Article 04, Oct. 2016, 24 pages.

Narayana et al., "Joint Server Selection and Routing for Geo-Replicated Services ", IEEE/ACM 6th International Conference on Utility and Cloud Computing, 2013, pp. 423-428.

Narayanan et al., "Reducing Latency Through Page-aware Management of Web Objects by Content Delivery Networks", In Proceedings of the 2016 ACM Sigmetrics International Conference on Measurement and Modeling of Computer Science (SIGMETRICS '16), Jun. 14-18, 2016, 12 pages.

Roussopoulos et al., "Practical load balancing for content requests in peer-to-peer networks", Distributed Computing, vol. 18(6), Jun. 2006, pp. 421-434.

Rula et al., "Behind the Curtain—Cellular DNS and Content Replica Selection ", In Proceedings of the 2014 Conference on Internet Measurement Conference (IMC '14), Nov. 5-7, 2014, 13 pages.

Satyen Kale, "Multiarmed BanditsWith Limited Expert Advice", JMLR: Workshop and Conference Proceedings,vol. 35, 2014, 16 pages.

Sen et al., "Contextual Bandits with Stochastic Experts", Research Gate, Feb. 23, 2018, 21 pages.

Suresh et al., "C3: Cutting Tail Latency in Cloud Data Stores via Adaptive Replica Selection", 12th USENIX Symposium on Networked Systems Design and Implementation (NSDI '15), May 4-6, 2015, 16 pages.

Talebi et al., "Stochastic Online Shortest Path Routing: The Value of Feedback", IEEE Transactions on Automatic Control, Jan. 18, 2017, pp. 1-18.

Tehrani et al., "Distributed Online Learning of the Shortest Path Under Unknown Random Edge Weights", ICASSP, IEEE, 2013, pp. 3138-3142.

Tran et al., "MABRESE: A new server selection method for Smart SDN-based CDN architecture", Journal of Latex Class Files, vol. 14, No. 08, Aug. 2015, 5 Pages.

Tran et al., "QoE-Based Server Selection for Content Distribution Networks", IEEE Transactions On Computers, vol. 63, No. 11, Nov. 2014, pp. 2803-2815.

Vries et al., "Broad and Load-Aware Anycast Mapping with Verfploeter", In Proceedings of the 2017 Internet Measurement Conference (IMC '17), Nov. 1-3, 2017, 12 pages.

Wassermann et al., "Anycast on the Move: A Look at Mobile Anycast Performance". Network Traffic Measurement and Analysis Conference (TMA), Jun. 2018, pp. 9 pages.

Wendell et al., "DONAR: Decentralized Server Selection for Cloud Services", In Proceedings of the ACM SIGCOMM 2010 Conference (SIGCOMM '10), Aug. 30-Sep. 3, 2010, pp. 231-242.

Xia et al., "Thompson Sampling for Budgeted Multi-armed Bandits", Proceedings of the Twenty-Fourth International Joint Conference on Artificial Intelligence (IJCAI 2015), 2015, pp. 3960-3966.

Yu et al., "Authority Server Selection of DNS Caching Resolvers", ACM SIGCOMM Computer Communication Review, vol. 42, No. 2, Apr. 2012, pp. 80-86.

Zhou et al., "Near Optimal Adaptive Shortest Path Routing with Stochastic Links States under Adversarial Attack", Semantic Scholar,Oct. 11, 2016, 20 pages.

\* cited by examiner

DYNAMIC NETWORK SERVICE DATA ROUTING BASED ON MEASURED NETWORK PERFORMANCE DATA

BACKGROUND

When an application or other functionality is provided to a network, it can be provided in many ways. A traditional way of providing the application or functionality was to distribute the software to each client device to be executed locally. Another traditional way of providing the application or functionality was to host the software on a server somewhere within the network and allow client devices to connect with the server to access the application or functionality.

More recently, as such remotely hosted applications and functionalities have grown in scope and complexity, advanced forms of remote sharing have emerged as industry standards. One such form is providing the application or functionality as a service. As a service (aaS) refers to the application or functionality being hosted remotely (usually in a cloud computing environment, but more generally in a remote location) and provided to client devices without requiring local installation of software. Usually, such aaS offerings are accessed via a web browser or other web socket-aware software.

In traditional networks, private connections (e.g. MPLS) provided guaranteed (or near-guaranteed) bandwidth between network sites. A network service, whether hosted on the cloud or on a network site, had only a limited number of points of vulnerability where network health degradation would occur. However, with the advent of software defined wide area networks (SD-WANs), network paths between a client device and a network service are much less predictable. Further, many network services (especially large-scale services) have multiple points of entry dispersed geographically to improve performance for client devices that are increasingly globally distributed.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
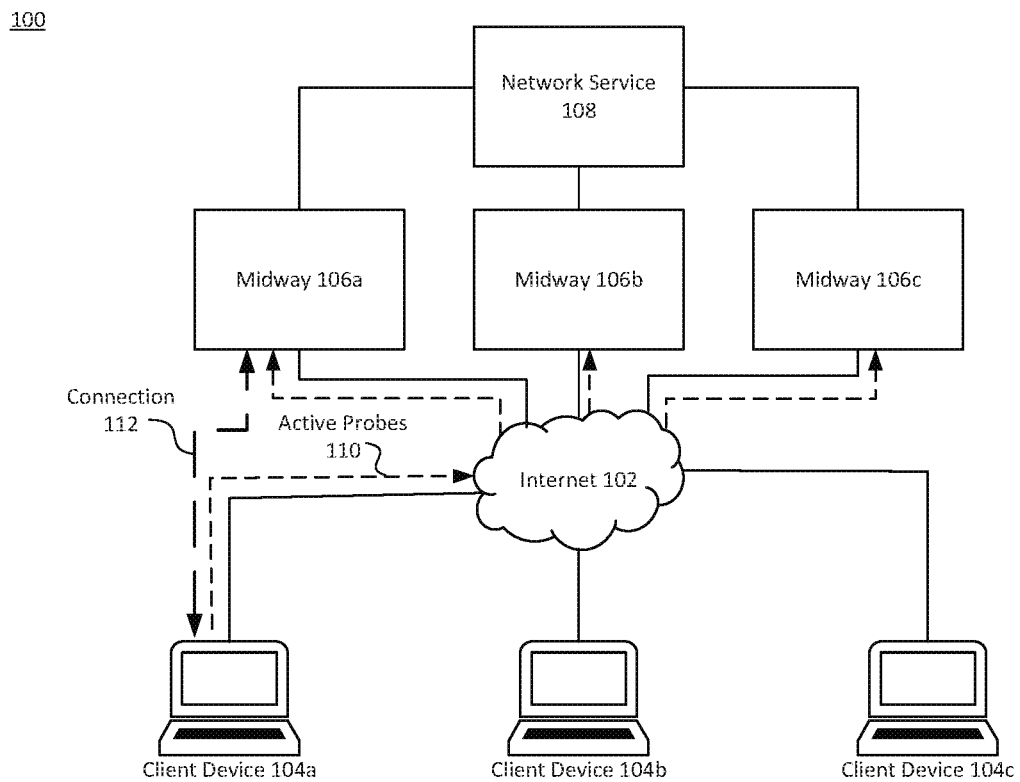
FIG. 1 illustrates an example network connecting client devices to a network service.

Certain examples have features that are in addition to or in lieu of the features illustrated in the above-referenced figures. Certain labels may be omitted from certain figures for the sake of clarity.

DETAILED DESCRIPTION

Although somewhat counterintuitive, the geographically nearest point of entry for a network service may not be the most efficient network path between a client device and the network service. Furthermore, while a certain network path may be the most efficient for a certain time period, dynamic changes to the network cause a different network path to become most efficient.

One substantial complication is the fact that not all portions of the network path, especially in SD-WANs, are part of the administrative domain including the client device. A network path connecting a branch network site to a headquarters network site usually passes through the Internet, and the portions of the path through the Internet are not able to be inspected in the same way as the portions within the administrative domain can be. This makes it difficult to definitively measure and determine a best network path for network service traffic. Often, less efficient paths are selected via manual configuration (e.g. direct traffic via the most direct path to the geographically nearest entry), or via simple comparison of path performance to thresholds.

In examples consistent with this disclosure, a client device gathers network information actively (e.g. via probing) and passively (e.g. via inspecting the health of a data connection) and determines a best entry point using a reinforcement learning algorithm. The reinforcement learning algorithm, a multi-armed bandit algorithm, determines the best entry point using one or more strategies.

As used in this disclosure, a multi-armed bandit algorithm is an algorithm designed to solve a problem formulated as a multi-armed bandit problem, including contextual bandit problems and adversarial bandit problems, for example. As would be clear to a person having ordinary skill in the art, there are many algorithms suitable to solve multi-armed bandit problems.

In examples consistent with this disclosure, entry point selection is formulated as a sequential decision problem, where the client device has to select a series of entry points over time. Since the client device doesn't have a complete set of information about the network, the results of each successive decision are observed and are used to improve the prediction of the multi-armed bandit algorithm in the next decision round.

For example, network probes (e.g. TCP SYN, ICMP ping, etc.) are sent to each available entry point from the client device (or a representative for the client device, such as a network infrastructure device or a network orchestrator). Once responses are received for the network probes, network health information is determined based on the characteristics of the responses (for example, round trip time). This active network performance data is input into the multi-armed bandit algorithm to predict a most efficient (best) entry point for accessing the network service from the client device for a round of the successive decision problem of finding the optimal entry point.

While there are many particular multi-armed bandit formulations that the optimal entry point problem could take, two conceptualizations are discussed in detail in this disclosure. The first is the contextual bandit model, where contextual information (e.g. the active network performance data) is input to the algorithm before each round of selection and an expected reward for each entry point is determined using a regression model that models a relationship between the contextual information and the reward. The expected reward is a value used to represent a predicted efficiency of using each respective entry point. Upon selecting a best entry point based on the entry point's expected reward value, a data connection is established between the client device and the selected entry point. Passive network performance data is determined by observing data traffic traversing the data connection, and is used to determine an actual reward value. The algorithm is updated based on the actual reward value and begins another round of selection thereafter.

The second is the adversarial bandit model, where the algorithm relies on a set of experts (i.e. algorithms that receive the active network performance data as input and produce advice as output). The advice from each expert is a probability distribution representing the probability of selecting a certain entry point of the set of entry points. Each expert may be configured to emphasize or de-emphasize certain characteristics of the network's performance when generating its advice. The prediction algorithm then combines the advice from all of the experts to generate a final probability distribution. The combination may be weighted to account more strongly or less strongly for the advice of certain experts. Based on the final probability distribution, an entry point is selected, and similarly to the contextual bandit model, a data connection is established, and passive network performance data is captured and fed back into the prediction algorithm.

Examples consistent with this disclosure have many technical advantages over the prior art. For example, the number of switches between different entry points in a stable system are reduced compared to known algorithms, the amount of data traffic used during the active network performance data gathering is reduced as compared to known algorithms, and the awareness of the performance level of the network is improved compared to known algorithms.

FIG. 1 illustrates an example network connecting client devices to a network service. Network 100 includes Internet 102, client devices 104, midways 106, and network service 108. Client devices 104 transmit active probes 110 through Internet 102 to the midways 106 to measure the health of the links between the client device 104 and the midways 106. Midways 106 provide connectivity to network service 108. Connection 112 is established between a client device 104 and a midway 106 once the client device 104 determines the best midway 106. Connection 112 may transact data relating to network service 108 between client device 104 and midway 106 via a tunnel (e.g. an IPSec encrypted tunnel).

Client devices 104 located at a network site may access a network service 108 hosted at another network site, in a private cloud, or in the public cloud. The network service 108 may be an application, tool, or other software provided as a service to client devices 104. Due to the global nature of business, client devices 104 may be located very geographically distant from one another, which can cause differences in service quality between client devices 104. This is especially true in SD-WAN topologies where a large segment of the network path between a network service 108 and a client device is in the Internet 102.

For example, a client device 104a may be located in a Bangalore, India site, which is connected to an enterprise SD-WAN 100 via a pair of digital subscriber line (DSL) Internet 102 connections. Network Service 108 may, for example, be a payroll application hosted in a headquarters office in Santa Clara, Calif. In some traditional deployments, data transceived between the client device 104a and network service 108 may pass through thousands of miles of shared Internet 102 links, which makes it difficult to guarantee quality of service of the network service 108. In order to ameliorate some of the uncertainty of transacting data between a client device 104 and a network service 108 via Internet 102, an intervening device may be placed in the network path between client device 104 and network service 108 to avoid or reduce the path health impact of traversing portions of the network path across Internet 102.

In some networks, entry points (i.e. midways) 106 are deployed closer to sites containing client devices 104, providing a more performant path to network service 108. There are many ways in which midways 106 may be deployed, including by connecting to network service 108 via a private link (e.g. MPLS), connecting to network service 108 via one or more large-throughput public links (e.g. DSL, 5G, etc.), executing a local instance of network service 108 locally (e.g. distributed database, distributed service), and providing network resiliency features by distributing the load onto multiple links. Some example midways consistent with this disclosure include virtual private cloud entry points, VPN concentrators, public cloud entry points, and any other appropriate device for providing access to a network service.

However, while the midways 106 improve the quality of connection between client devices 104 and network service 108, uncertainty remains as to which midway 106a-c each client device 104a-c should connect to. The most naïve solution, a hard coded connection from a client device 104a to the geographically nearest midway 106a does not always select the most performant path between client device 104a and network service 108. As can be appreciated by a person having ordinary skill in the art, the shortest path isn't always the quickest path in computer networking. More robust solutions exist that account for path cost, link quality and other traditional path quality measurements when determining which midway 106 a client 104a should connect 112 to.

However, the dynamic nature of network health, especially across Internet 102, can wreak havoc with solutions built on traditional path quality measurements. In fact, selecting a best Internet-traversing path from a client device to one of a number of midways, accounting for dynamic changes in path quality, is a very difficult problem to solve.

Examples consistent with this disclosure describe using active probing and passive measurements of network traffic to create and update a reinforcement learning algorithm that selects a best midway 106a-c for the respective client device 104a.

Periodically, client device 104a transmits active probes 110 to measure active network performance data on network paths through Internet 102 to each midway 106a-c. For example, the active probes 110 may be TCP SYN packets, ICMP packets, or any other appropriate probes. The network performance data may include traditional network path health parameters (e.g. jitter, latency, packet drops, round trip time, etc.) as well as additional health parameters that can be measured using active probes, as would be understood by a person having ordinary skill in the art. Upon receiving responses from each midway 106a-c, the reinforcement learning algorithm of client device 104a calculates a series of expected rewards corresponding to each midway 106a-c based on the network performance data gathered from the active probes 110.

As can be appreciated by a person having ordinary skill in the art, midway selection can be modeled as a multi-armed bandit problem. Referencing the slot machine example described later in this disclosure, each midway 106 is roughly analogous to a slot machine, each client device 104 is roughly analogous to a player, time slices between each round of active probes 110 are roughly analogous to another pull at a slot machine, and the quality of the connection between a client device 104a and network service 108 via a midway 106a is roughly analogous to a payout from a pull of a slot machine.

The following describes an example operation of a multi-armed bandit algorithm on client device 104a to select a midway 106a-c. Over a period of time, a certain number of rounds T of midway selection occur. For example, over 3200 minutes, T=100 rounds of selection may occur, spread evenly over the duration (i.e. 32 minutes per round). During a round t, the algorithm selects a midway 106a from the set of midways 106 and observes the end-to end network performance across connection 112 via passive measurements of data traffic being transacted between client device 104a and network service 108. From the passive network performance data, the algorithm determines a reward r_at for the selection of midway 106a at round t.

The additional information provided by active probes 110 provide a source of side information to the algorithm that can be used to improve the selection process. In some examples, this addition of side information allows the midway selection problem to be formulated as a contextual bandit problem, which is a sub-genre of multi-armed bandit problems where side information is used to improve the outcome. A stochastic multi-armed bandit algorithm can be used to solve contextual bandit problems.

For example, during each round t, the stochastic multi-armed bandit algorithm of client device 104a is provided with path health information x for each midway from a latest round of periodic active probing 110. As each round t occurs, an additional set of path health information is added to a matrix X, from which the cumulative path health data is input to the stochastic multi-armed bandit algorithm to determine midway selection for the round t. The reward r_at for each round is added to another matrix Y.

If it is assumed that there is a linear relationship between the actively measured path health information (stored in matrix X) and the passively measured path health information (stored in matrix Y), an expected reward E can be calculated using solely the actively measured path health information. Mathematically this can be represented as $$E[Y|X]=X^T\theta$$

where $\theta$ is the true coefficient vector describing the linear relationship between matrix X and matrix Y. For a specific round t, if the best midway is a', the maximum reward can be represented as $r\_a't=x\_a't\Theta$. The expected reward given the selection by the algorithm can be represented as $r\_at=x\_at\theta$, and many algorithms may be applied to estimate the parameters (i.e. the coefficient values) of the linear relationship in order to estimate a reward for each round and select a midway. However, since there is incomplete information about the network, the selected midway a will not always be the best midway a'. When a non-optimal midway is selected, there is regret for that round. Regret for a round is marginal network performance that is "left on the table" by selecting a non-optimal midway. The regret for a round is $Rt=x\_a't\theta-x\_at\theta$. The regret Rt for choosing the best midway is zero, and increases as the selection of midway gets further from optimal.

Since regret is a measure of deviation from the optimal selection, a good algorithm for selecting a midway has low regret. Since the relationship between the active network performance data x (stored in matrix X) and passive network performance data r (stored in matrix Y) is linear, many regression algorithms may be applied to estimate the parameters ($\theta$) of the linear model used to determine the expected reward for each round, including multiple linear regression, logistic regression, and ridge regression, as a few examples. In some examples, an upper confidence bound (UCB) strategy using a ridge regression algorithm can establish an upper bound on regret over a series of rounds. The cumulative regret over the entire set of rounds T is mathematically represented as:

$$R_T = \sum_{t=1}^{T} x_{a'_t}\theta - x_{at}\theta$$

Using the UCB strategy, R_T is bounded at $O(d\sqrt{T})$, where d is the dimensionality of the vector of active network health data.

Applying this stochastic multi-armed bandit algorithm in the network, client device 104a, after gathering the active network performance data from active probes 110, begins a round of reinforcement learning by using a regression algorithm (e.g. the UCB strategy using the ridge regression algorithm) to determine an estimated coefficient for the linear model relating the active network performance data to the expected passive network performance data using current and history active network performance data, as well as historic passive network performance data. Client device 104a then applies the estimated coefficient to the linear model to calculated estimated rewards for each midway 106a-c based on the measured active network performance data. Client device 104a then selects a midway 106a that is expected to be the best midway because its expected reward is the highest of all midways 106. Client device 104a then establishes a connection 112 to network service 108 through the selected midway 106a and begins to transact data via connection 112. As data is transacted, client device 104a passively measures network performance data evident from the transacted data (e.g. jitter, latency, RTT, etc.). After a period of time or other event triggers a new round of reinforcement learning, the measured passive network performance data is input to the reinforcement learning algorithm, and the process of selecting a best midway 106 begins again.

In some other examples, the active network performance data allows the midway selection problem to be formulated as an adversarial bandit problem, which is a sub-genre of multi-armed bandit problems a set of experts take in contextual information and generate predictions based on the contextual information. An adversarial multi-armed bandit algorithm can be used to solve adversarial bandit problems.

For example, during each round t, the adversarial multi-armed bandit algorithm of client device 104a provides each expert of the set of experts, and each expert returns an advice vector $\xi$. Each advice vector includes a value for each midway corresponding to the probability of selecting that midway. The algorithm then combines the advice vectors to generate a final probability distribution for the round t. In some examples, the algorithm sums the probability for each midway across the experts and selects a midway based on the cumulative probability. In some other examples, each expert "votes" for a midway based on the experts' individual advice vectors, and the midway with the most votes is selected. In some examples, different experts are given different weights based on methodology, accuracy, and/or other considerations. For example, one strategy for determining the final probability distribution for a given midway is the Exp4 strategy, which is expressed mathematically as:

$$p_t(a) = (1-\gamma)\sum_{i=1}^{N} \frac{f(r_{at}, \xi_{t,a}^i)}{W} + \frac{Y}{K}$$

where γ is a tuning parameter that controls the propensity of the MAB algorithm to choose exploration or exploitation, N is the number of experts, $f$ is a function that incorporates previously observed passive network performance data with to increase the likelihood of selecting midways with higher rewards, W normalizes the weights on the experts, and K is the number of midways.

Each expert may calculate their advice dependent on an algorithm. One benefit of the adversarial algorithm is that multiple types of algorithm can be used, each expert can update as additional data is received, and different permutations of the same algorithm (with various parameters adjusted to change the behavior of the algorithm) can be simultaneously run.

For example, two classes of experts that are used are Auto-Regressive Integrate Moving Average (ARIMA) experts and Regression based experts. Unlike the single workflow for prediction (estimated reward) in the stochastic model, the adversarial model may implement one or more of many workflows for prediction, including using experts to forecast a single relevant parameter (e.g. round trip time) for each midway, experts to determine an expected reward based on a single parameter (e.g. round trip time), and experts to determine an expected reward based on multiple parameters (e.g. the active network performance data). The type of expert can be selected based on the workflow. For example, ARIMA experts are particularly suited for receiving time-series data of a single parameter and predicting results based on the time series data. On the other hand, regression based experts are more suitable for cases where time series data is not available and/or more complex between parameters. For example, in cases where throughput maximization is the goal, but measuring throughput on all midways is impractical, a regression based expert may model a relationship between round trip time measured by active probes 110 and throughput as passively measured on selected midways. One such example of a regression expert is a lasso regression expert.

As mentioned above, there are various strategies for incorporating the advice vectors of the experts, including, among others, voting strategies and advice weighting strategies. The reinforcement learning algorithm may gather information, including a prediction accuracy score, relating to the trustworthiness of each expert. Once the final probability distribution is determined, a best midpoint is selected using a methodology as discussed above.

Applying this adversarial multi-armed bandit algorithm in the network, client device 104a, after gathering the active network performance data from active probes 110, begins a round of reinforcement learning by inputting the active network performance data to a series of experts (ARIMA, regression, and other algorithms) to each respectively adjust their algorithms based on the active network performance data. Each expert then generates an advice vector consisting of a probability of selection as best for each midway. Client device 104a then aggregates the advice vectors from all of the experts to generate a final probability distribution. Client device 104a then selects a midway 106a that is expected to be the best midway based on the final probability distribution. Client device 104a then establishes a connection 112 to network service 108 through the selected midway 106a and begins to transact data via connection 112. As data is transacted, client device 104a passively measures network performance data evident from the transacted data (e.g. jitter, latency, RTT, etc.). Prior to the initialization of a new round of reinforcement learning, the measured passive network performance data is input to the reinforcement learning algorithm to calculate an accuracy of each expert and is provided to each expert to each respectively adjust their algorithms. Then the process of selecting a best midway 106 begins again.

Various adjustments and filters may be applied to improve the robustness of the algorithm, as would be apparent to a person having ordinary skill in the art. This includes, for example, a Savitzky-Golay filter to reduce bouncing due to noisy training data.

Figure 2:
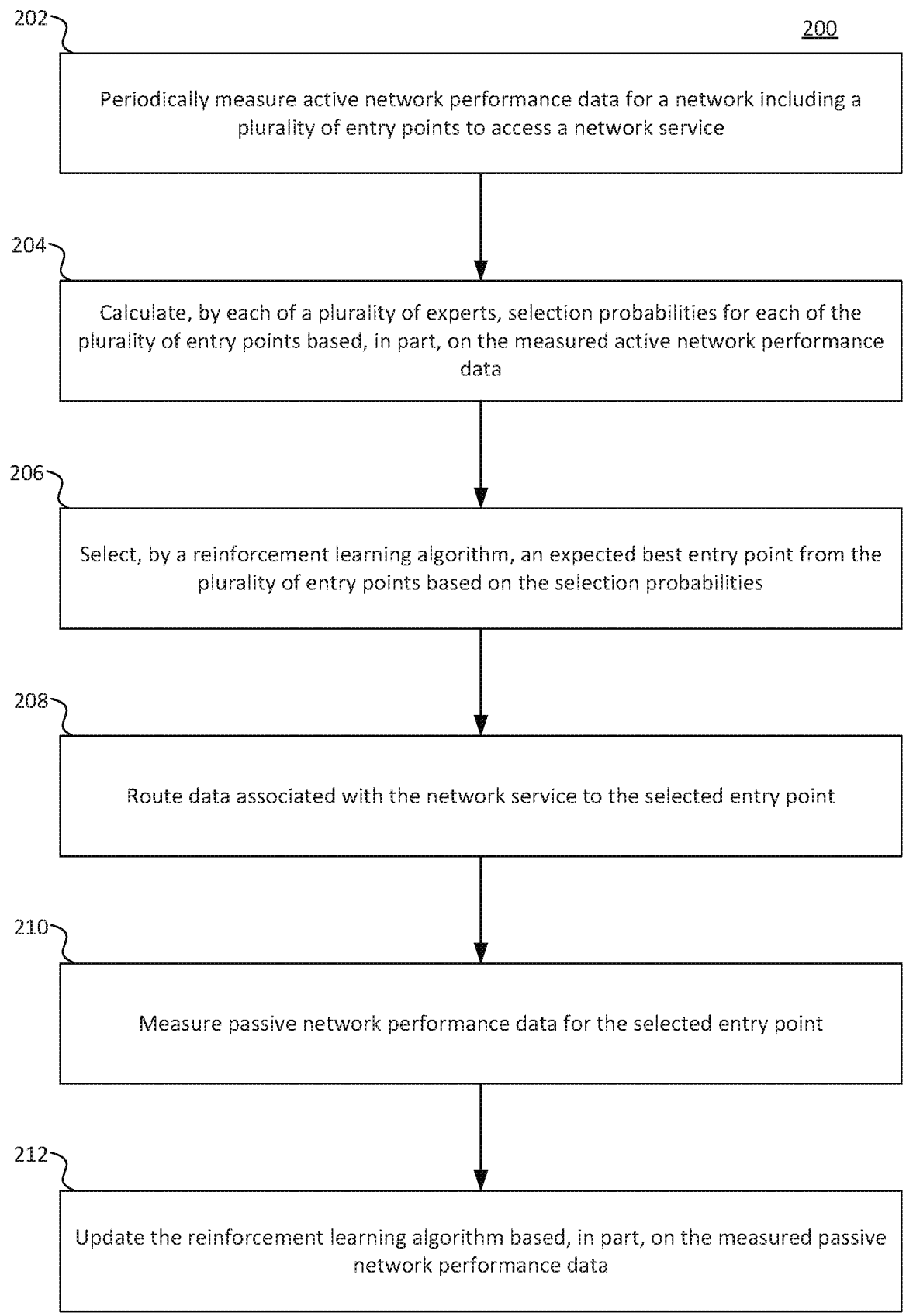
FIG. 2 is a flowchart illustrating an example method for efficiently connecting a client device to a network service.

FIG. 2 is a flowchart illustrating an example method for efficiently connecting a client device to a network service. Method 200 may be encoded on a non-transitory, computer-readable medium as instructions that, when executed by processing circuitry, cause a device to execute certain actions.

In block 202, active network performance data is periodically measured for a network including a plurality of entry points to access a network service. In some examples, measuring the active network performance data includes transmitting a network probe (e.g. a TCP SYN, an ICMP) to each of the plurality of entry points and measuring characteristics of a response to the probe.

In block 204, selection probabilities are calculated for each of the plurality of entry point by each of a plurality of experts. The selection probabilities are calculated based, in part, on the measured active network performance data. In some examples, each of the plurality of experts includes an algorithm that receives the active network performance data as input, as well as passive network performance data from a previously selected entry point. In certain examples, the selection probabilities are advice vectors including a probability of selection for each entry point.

In block 206, an expected best entry point is selected by a reinforcement learning algorithm and from the plurality of entry points based on the selection probabilities. In some examples, the reinforcement learning algorithm is a multi-armed bandit algorithm. In certain examples, the selection probabilities are probability distributions of the likelihood of selecting each entry point of the plurality of entry points as an expected best entry point. In some examples, selecting the expected best entry point includes combining the probability distributions of the set of experts into an aggregate probability distribution, and selecting an entry point with the highest probability.

In block 208, data associated with the network service is routed to the selected entry point. In some examples, secure tunnels are created between the client device and the entry point, and between the entry point and the network service device.

In block 210, passive network performance data is measured for the selected entry point. In some examples, the passive network performance data is measured using data transacted between the client device and the network service device.

In block 212, the reinforcement learning algorithm is updated based, in part, on the measured passive network performance data. In some examples, updating the reinforcement learning algorithm includes, upon measuring the passive network performance data, calculating updated parameters for algorithms of each expert of the set of experts based, in part, on the measured passive network performance data. In some other examples, updating the reinforcement learning algorithm includes calculating updated parameters for a linear model corresponding to an expected reward.

Figure 3:
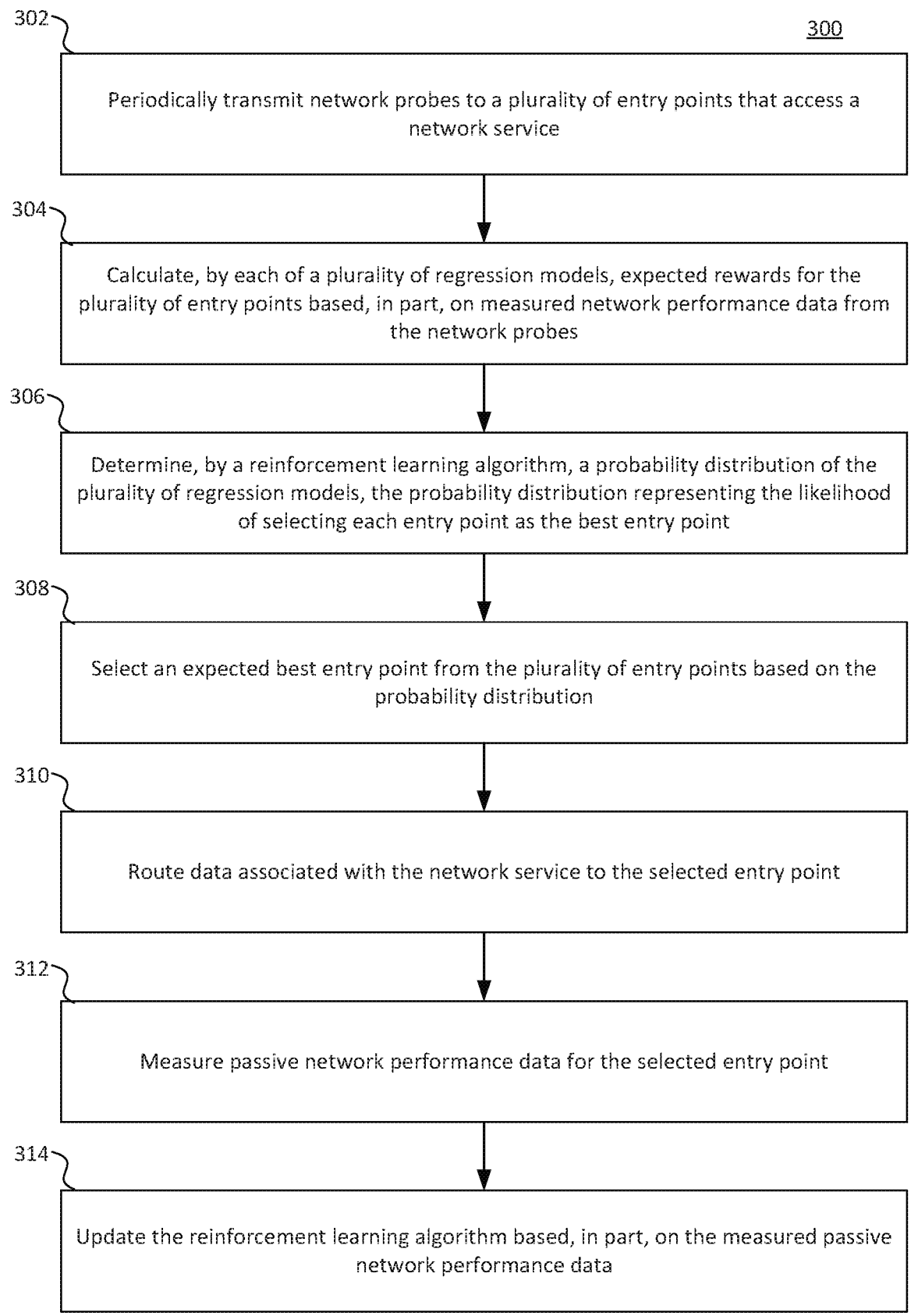
FIG. 3 is a flowchart illustrating another example method for efficiently connecting a client device to a network service.

FIG. 3 is a flowchart illustrating another example method for efficiently connecting a client device to a network service. Method 300 may be encoded on a non-transitory, computer-readable medium as instructions that, when executed by processing circuitry, cause a device to execute certain actions.

In block 302, network probes are periodically transmitted to a plurality of entry points to access a network service. In some examples, transmitting a network probe (e.g. a TCP SYN, an ICMP) includes measuring characteristics of a response to the probe.

In block 304, expected rewards are calculated for each of the plurality of entry point by each of a plurality of regression models. The expected rewards are calculated based, in part, on the measured characteristics of the response to the probe. In some examples, each of the plurality of experts includes an algorithm that receives the active network performance data as input, as well as passive network performance data from a previously selected entry point. In certain examples, the expected rewards are advice vectors including a probability of selection for each entry point.

In block 306, a probability distribution of the plurality of regression models is determined by a reinforcement learning algorithm. The probability distribution represents the likelihood of selecting each entry point as the best entry point. In some examples, the reinforcement learning algorithm is a multi-armed bandit algorithm.

In block 308, an expected best entry point is selected by a reinforcement learning algorithm and from the plurality of entry points based on the probability distribution. In some examples, selecting the expected best entry point includes selecting an entry point of the plurality of entry points with a maximum probability in the aggregate probability distribution.

In block 310, data associated with the network service is routed to the selected entry point. In some examples, secure tunnels are created between the client device and the entry point, and between the entry point and the network service device.

In block 312, passive network performance data is measured for the selected entry point. In some examples, the passive network performance data is measured using data transacted between the client device and the network service device.

In block 314, the reinforcement learning algorithm is updated based, in part, on the measured passive network performance data. In some examples, updating the reinforcement learning algorithm includes, upon measuring the passive network performance data, calculating updated parameters for algorithms of each expert of the set of experts based, in part, on the measured passive network performance data. In some other examples, updating the reinforcement learning algorithm includes calculating updated parameters for a linear model corresponding to an expected reward.

Figure 4:
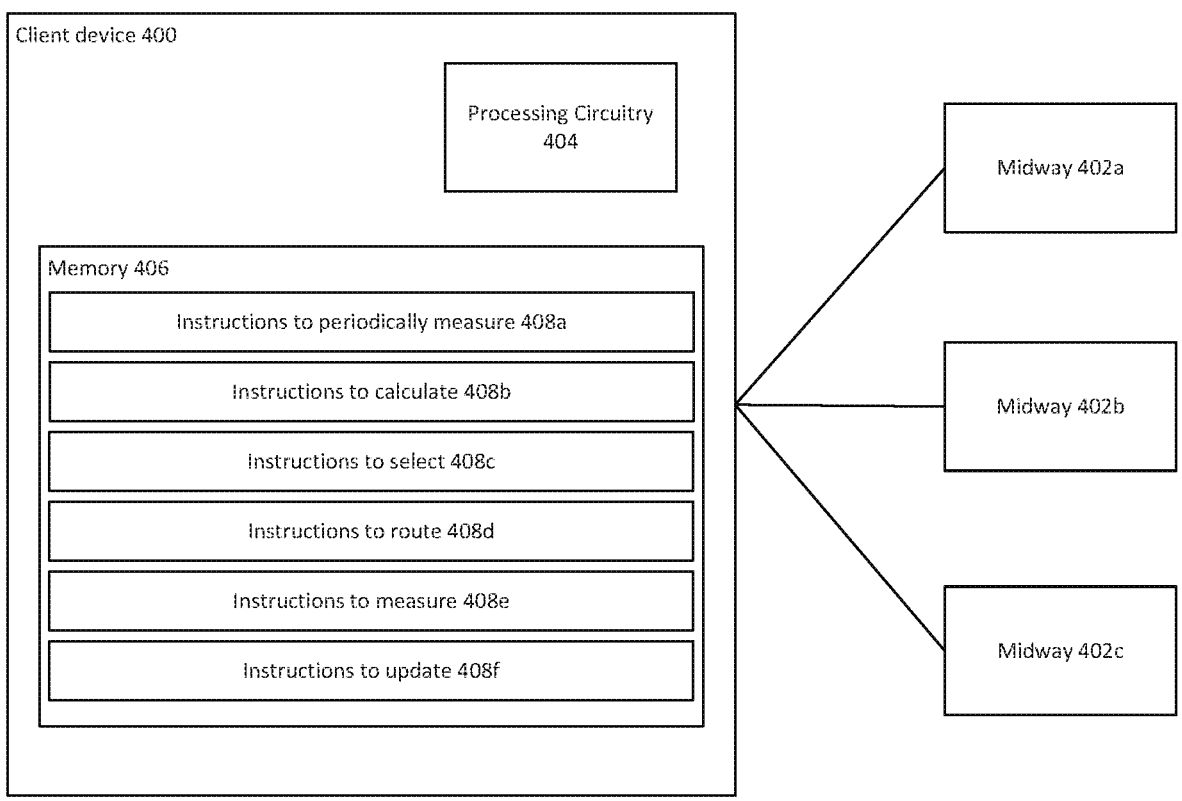
FIG. 4 illustrates an example client device connected to a plurality of midways.

FIG. 4 illustrates an example client device connected to a plurality of midways. Client device 400 connects to midways 402a-c via the Internet. Client device 400 includes processing circuitry 404 and memory 406, which includes instructions 408a-f. Instructions 408, when executed by processing circuitry 404, cause client device 400 to take certain actions.

In instructions 408a, active network performance data is measured for each midway 402a-c from client device 400. In some examples, network probes are transmitted to midways 402a-c. In some examples, transmitting a network probe (e.g. a TCP SYN, an ICMP) includes measuring characteristics of a response to the probe.

In instructions 408b, expected rewards are calculated for each of the midways 402a-c by each of a plurality of regression models. The expected rewards are calculated based, in part, on the measured characteristics of the response to the respective probes. In some examples, each of the plurality of experts includes an algorithm that receives the active network performance data as input, as well as passive network performance data from a previously selected midway 402. In certain examples, the expected rewards are advice vectors including a probability of selection for each midway 402.

In instructions 408c, an expected best midway is selected by a reinforcement learning algorithm and from midways 402a-c based on the expected rewards. In some examples, selecting the expected best midways includes selecting a midway 402 with a maximum probability in an aggregate probability distribution.

In instructions 408d, data associated with the network service is routed to the selected midway 402. In some examples, secure tunnels are created between the client device and the midway 402, and between the midway 402 and the network service device (not shown).

In instructions 408e, passive network performance data is measured for the selected midway 402. In some examples, the passive network performance data is measured using data transacted between the client device and the network service device.

In instructions 408f, the reinforcement learning algorithm is updated based, in part, on the measured passive network performance data. In some examples, updating the reinforcement learning algorithm includes, upon measuring the passive network performance data, calculating updated parameters for algorithms of each expert of the set of experts based, in part, on the measured passive network performance data. In some other examples, updating the reinforcement learning algorithm includes calculating updated parameters for a linear model corresponding to an expected reward.

Figure 5:
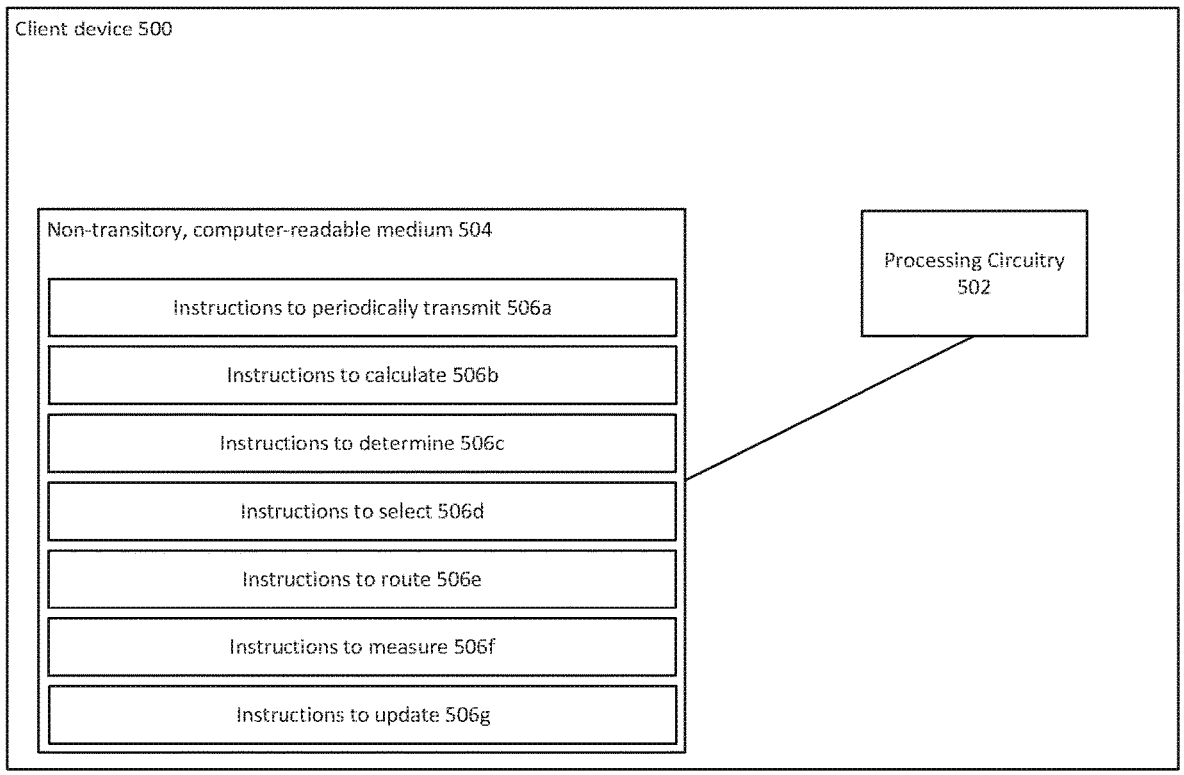
FIG. 5 illustrates an example client device.

FIG. 5 illustrates an example client device. Client device 500 includes processing circuitry 502 coupled to non-transitory, computer-readable medium 504 including instructions 506a-g which, when executed by processing circuitry 502, cause client device 500 to undertake certain actions.

In instructions 506a, network probes are periodically transmitted to a plurality of entry points to access a network service. In some examples, transmitting a network probe (e.g. a TCP SYN, an ICMP) includes measuring characteristics of a response to the probe.

In instructions 506b, expected rewards are calculated for each of the plurality of entry point by each of a plurality of regression models. The expected rewards are calculated based, in part, on the measured characteristics of the response to the probe. In some examples, each of the plurality of experts includes an algorithm that receives the active network performance data as input, as well as passive network performance data from a previously selected entry point. In certain examples, the expected rewards are advice vectors including a probability of selection for each entry point.

In instructions 506c, a probability distribution of the plurality of regression models is determined by a reinforcement learning algorithm. The probability distribution represents the likelihood of selecting each entry point as the best entry point. In some examples, the reinforcement learning algorithm is a multi-armed bandit algorithm.

In instructions 506d, an expected best entry point is selected by a reinforcement learning algorithm and from the plurality of entry points based on the probability distribution. In some examples, selecting the expected best entry point includes selecting an entry point of the plurality of entry points with a maximum probability in the aggregate probability distribution.

In instructions 506e, data associated with the network service is routed to the selected entry point. In some examples, secure tunnels are created between the client device and the entry point, and between the entry point and the network service device.

In instructions 506f, passive network performance data is measured for the selected entry point. In some examples, the passive network performance data is measured using data transacted between the client device and the network service device.

In instructions 506g, the reinforcement learning algorithm is updated based, in part, on the measured passive network performance data. In some examples, updating the reinforcement learning algorithm includes, upon measuring the passive network performance data, calculating updated parameters for algorithms of each expert of the set of experts based, in part, on the measured passive network performance data. In some other examples, updating the reinforcement learning algorithm includes calculating updated parameters for a linear model corresponding to an expected reward.

Entry points (also called midways) are devices that provide access to a network service for client devices. An entry point may provide access to a single network service or to many related or unrelated network services. There may be any number of entry points on a given network, and in a given region of a network.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

Multi-armed bandit problems are a type of logical problem that can be used to model real-life engineering challenges where choices are to be made using an incomplete set of information. The traditional real-life example from which the multi-armed bandit problem gets its name is playing slot machines (one-armed bandits) in a casino. Assuming that the slot machines each pay out based on different probability distributions odds, how does a player maximize their winnings given that they have 25 nickels in their pocket? The incompleteness of information should be appreciated in this example, as there is no way for the player to know what the probability distribution of each slot machine is. The primary tension present in solutions to multi-armed bandit problems are between exploring and exploiting. Does the player stay at the current slot machine for another pull, or do they switch to another machine in hopes of a better payout?

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals. Mathematical variables may be represented differently in equations than in text. For example, a variable with a subscript may be written in text as variable-subscript.

The invention claimed is:

1. A client device, comprising:
   processing circuitry; and
   a memory including instructions that, when executed by the processing circuitry, cause the client device to:
      periodically measure active network performance data for a network including a plurality of entry points to access a network service;
      calculate, by a reinforcement learning algorithm, expected rewards for the plurality of entry points, based, in part, on a measured network performance data, wherein the expected rewards comprise advice vectors that include a probability of selection for each of the plurality of entry points;
      select an expected best entry point from the plurality of entry points, based on the expected rewards;
      route data associated with the network service to the selected entry point;
      measure passive network performance data for the selected entry point; and
      update the reinforcement learning algorithm, wherein updating the reinforcement learning algorithm involves incorporating the measured passive network performance data and the active network performance data.

2. The client device of claim 1, wherein measuring the active network performance data comprises transmitting a network probe to each of the plurality of entry points and measuring characteristics of the probe.

3. The client device of claim 1, wherein the reinforcement learning algorithm is a multi-armed bandit algorithm.

4. The client device of claim 3, wherein the multi-armed bandit algorithm receives contextual information for each entry point of the plurality of entry points, predicts an expected reward value for the each entry point, and selects an expected best entry point from the plurality of entry points based on the expected reward values.

5. The client device of claim 4, wherein updating the reinforcement learning algorithm comprises the multi-armed bandit algorithm, upon measuring the passive network performance data, calculating updated contextual information and calculating updated expected rewards based, in part, on the updated contextual information.

6. The client device of claim 3, wherein the multi-armed bandit algorithm receives advice from a set of experts representing probability distributions of the likelihood of selecting each entry point of the plurality of entry points as an expected best entry point.

7. The client device of claim 6, wherein selecting the expected best entry point comprises combining the probability distributions of the set of experts into an aggregate probability distribution, and selecting an entry point with the highest probability.

8. The client device of claim 6, wherein updating the reinforcement learning algorithm comprises the multi-armed bandit algorithm, upon measuring the passive network performance data, calculating updated probability distributions for each expert of the set of experts based, in part, on the measured passive network performance data.

9. A method, comprising:
   periodically measuring active network performance data for a network including a plurality of entry points to access a network service;
   calculating, by each of a plurality of experts, selection probabilities for each of the plurality of entry points, based, in part, on a measured active network performance data, wherein the measured active network performance data comprises advice vectors that include a probability of selection for each of the plurality of entry points;
   selecting, by a reinforcement learning algorithm, an expected best entry point from the plurality of entry points, based on the selection probabilities, wherein selecting the expected best entry point comprises weighting the plurality of experts based in part on previously measured network performance data and selecting the expected best entry point based on the weighted outputs of the plurality of experts;
   routing data associated with the network service to the selected entry point;
   measuring passive network performance data for the selected entry point; and
   updating the reinforcement learning algorithm, wherein updating the reinforcement learning algorithm involves incorporating the measured passive network performance data and the active network performance data.

10. The method of claim 9, wherein measuring the active network performance data comprises transmitting a network probe to each of the plurality of entry points and measuring characteristics of a response to the probe.

11. The method of claim 9, wherein the reinforcement learning algorithm is a multi-armed bandit algorithm.

12. The method of claim 9, wherein the selection probabilities are probability distributions of the likelihood of selecting each entry point of the plurality of entry points as an expected best entry point.

13. The method of claim 12, wherein selecting the expected best entry point comprises combining the probability distributions of the set of experts into an aggregate probability distribution, and selecting an entry point with the highest probability.

14. The method of claim 9, wherein updating the reinforcement learning algorithm comprises, upon measuring the passive network performance data, calculating updated parameters for algorithms of each expert of the set of experts based, in part, on the measured passive network performance data.

15. A non-transitory, computer-readable medium including instructions that, when executed by processing circuitry, cause a device to:

periodically transmit network probes to a plurality of entry points that access a network service;

calculate, by each of a plurality of regression models, expected rewards for the plurality of entry points, based in part on measured network performance data from the network probes, wherein the expected rewards comprise advice vectors that include a probability of selection for each of the plurality of entry points;

determine a probability distribution of the plurality of regression models, the probability distribution representing the likelihood of selecting each entry point of the plurality of entry points as the best entry point;

select an expected best entry point from the plurality of entry points, based on the probability distribution;

route data associated with the network service to the selected entry point;

measure passive network performance data for the selected entry point; and update the reinforcement learning algorithm, wherein updating the reinforcement learning algorithm involves incorporating the measured passive network performance data and the active network performance data.

16. The computer-readable medium of claim 15, wherein the reinforcement learning algorithm is a multi-armed bandit algorithm.

17. The computer-readable medium of claim 15, wherein determining the probability distribution comprises combining probability distributions of each of the set of experts into an aggregate probability distribution.

18. The computer-readable medium of claim 17, wherein selecting the expected best entry point comprises selecting an entry point of the plurality of entry points with a maximum probability in the aggregate probability distribution.

19. The computer-readable medium of claim 15, wherein updating the reinforcement learning algorithm comprises, upon measuring the passive network performance data, calculating updated probability distributions for each regression model based, in part, on the measured passive network performance data.

20. The computer-readable medium of claim 19, wherein the measured passive network performance data includes performance metrics measured on a data connection between the device and the network service.

\* \* \* \* \*